2,700,061

METHOD OF PREPARING ADSORBENT MATERIAL AND USING IT FOR SELECTIVELY ADSORBING AROMATIC HYDROCARBONS

James R. Owen, Bartlesville, Okla., assignor to Phillips Petroleum Company, a corporation of Delaware No Drawing. Application December 4, 1950, Serial No. 199,135

9 Claims. (Cl. 260—674)

This invention relates to solid adsorbents. In one aspect, it relates to a method for the preparation of solid adsorbents possessing improved properties. In another aspect, it relates to a method for the preparation of solid adsorbent material possessing a greater overall capacity and a greater selectivity for the adsorption of certain hydrocarbons.

An object of this invention is to provide a method for the preparation of a silica gel adsorbent having a greater capacity for the adsorption of hydrocarbons than silica gel adsorbents now available.

Another object of my invention is to provide a method for the preparation of a silica gel adsorbent which is more selective in the adsorption of one or more hydrocarbons from an admixture with other hydrocarbons.

Still other objects and advantages of my invention will be realized by those skilled in the art upon reading the following specification.

Silica gel or other metal oxide gel adsorbents are prepared by a conventional precipitation method in an aqueous medium and the gel cake purified by washing with water until the filtrate gives a negative test for any soluble material. Following this test, the gel is ordinarily dried to remove the excess water after which it is heated to activate the gel preparatory to use as an adsorbent. At the present time, metal oxide gels are prepared in large quantities according to this procedure.

I have found that in the preparation of such metal oxide gels if the final washing operations are modified the gel can be made to possess a greater overall capacity for adsorption of hydrocarbons, as well as greater selectivity for the adsorption of one or more hydrocarbons from admixture with other hydrocarbons. My discovery is that if a gel adsorbent is to be used for the adsorption of a given hydrocarbon, the gel, prior to drying and activation, should be washed with that hydrocarbon. For example, if an adsorbent gel is to be used for the adsorption of benzene, the gel should be washed with benzene prior to the final drying and activation step. An improved adsorbent gel may be prepared by the conventional precipitation method in an aqueous medium and the gel cake purified by washing with water until the filtrate gives a negative test for any soluble impurities. On account of the relative insolubility of hydrocarbons in water, the gel cake is suspended with stirring in acetone and extracted with acetone. The acetone solution is filtered from the gel. Sufficient washings of this nature with acetone are carried out so that the water is removed. The acetone-wet gel is then washed with the benzene as many times as are required to remove the acetone from the gel. Following the final benzene contacting, the benzene may be removed by filtration. The benzene remaining on the gel cake may be removed therefrom by heating and/or evacuation to form a xerogel or by vaporization of the benzene in an autoclave at an initial pressure above the critical pressure and at a temperature above the critical temperature of benzene to form an aerogel.

As an example of my process, a silica gel adsorbent of increased adsorptive capacity and selectivity for benzene was prepared by forming the initial gel in an aqueous medium, washing and filtering, as in a conventional preparation. The water in the filter cake was then replaced with acetone in a washing operation and the acetone replaced by benzene also by washing. The so-washed gel was then dried at elevated temperatures. This gel had a substantially greater adsorptive capacity for benzene and a greater selectivity for benzene than a gel prepared in a similar manner but without the acetone and benzene washing.

An unusual property of this type of gel is its extremely low density and consequent good properties as a heat insulating material. Where a low density is not desired, it may, for example, be formed into pellets prior to its use as an adsorbent.

EXAMPLE I

An improved silica gel adsorbent according to my invention was prepared by cooling one part by volume of sulfuric acid (specific gravity 1.2) and one part by volume of a sodium silicate solution (specific gravity 0.8) to 44° F., and adding the sodium silicate solution to the sulfuric acid solution during a five-minute period. The mixture was heated to 175° F. and maintained at that temperature for a period of about 4 hours. The precipitated gel was filtered from any solution and resuspended in distilled water at about 175° F. This resuspended gel was again filtered from the wash water. This washing operation was repeated until the filtrate gave a negative test for sulfate with a barium nitrate solution. Following the final filtration the gel cake was suspended with stirring in two volumes of acetone for a period of twenty-four hours. The gel was removed from this acetone by filtration and given two additional washing treatments with acetone. Following the final acetone washing step the gel was given three washings in two volumes of benzene each for a 24-hour period. After the final benzene washing operation the gel was filtered from the benzene and dried in air at 225° F. for 48 hours.

EXAMPLE II

Another silica gel adsorbent was prepared and washed with water alone for comparison purposes. One volume of sulfuric acid (specific gravity 1.2) was cooled to 44° F. and one volume of a sodium silicate solution (specific gravity 0.8) was cooled to the same temperature. The silicate solution was added to the acid solution during a five-minute period. The mixture was warmed to 175° F. and maintained at that temperature for a period of 6.5 hours. The precipitated gel was removed from any remaining liquid by filtration and suspended in distilled water at about 175° F. The gel was removed by filtration from the wash water and this washing operation was repeated until the filtrate gave a negative test for sulfate with a barium nitrate solution. The finally washed gel dried in air at 225° F. for a period of forty-eight hours. This method of preparation is substantially that used in preparing large quantities of commercial silica gel adsorbent.

The total capacity of a commercial silica gel adsorbent was determined by degassing it for sixteen hours at a pressure of about three microns and at a temperature of 175° F., heating it to 125° F. and exposing it to benzene vapors at a pressure of about 155 millimeters of mercury for sixteen hours. The benzene adsorbed by the commercial silica gel under these conditions was equal to the rated capacity given by the manufacturer.

The selectivity of the adsorbent for benzene was determined by degassing it for a period of sixteen hours at a pressure of about 3 microns and at a temperature of 175° F., adding ten volumes of a 5-volume per cent solution of benzene in normal-heptane per unit of weight of adsorbent. The gel and hydrocarbon liquid were cooled to about atmospheric temperature and air was admitted at atmospheric pressure. The gel and liquid were contacted for a period of five minutes after which the liquid was separated from the gel.

The surface area of the adsorbent was determined using a low temperature nitrogen adsorption method. The apparent density of the minus 200 mesh adsorbents was determined by pouring them into a 50-milliliter graduate and weighing. The packed density of the minus 200 mesh adsorbents was determined by filling a 50-milliliter graduate with an adsorbent until tapping the sides of the graduate with the metal blade of a spatula decreased the volume less than 0.1 ml.

Table 1
BENZENE ADSORPTION BY SILICA GELS

| | Commercial Gel | Benzene Wash, Ex. I | Control Gel, Ex. II |
|---|---|---|---|
| Surface area, sq. m./gram: | | | |
| Degassed at 175 F | | 986 | 835 |
| Degassed at 662 F | 632 | 925 | 756 |
| Percent Decrease caused by degassing at 662 F | | 6.2 | 9.5 |
| Relative surface area, degassed at 662 F | 1.00 | 1.46 | 1.20 |
| Apparent density, g./ml.: | | | |
| Poured | 0.66 | 0.12 | 0.41 |
| Relative | 1.00 | 0.18 | 0.62 |
| Packed | 0.75 | 0.17 | 0.69 |
| Relative | 1.00 | 0.23 | 0.92 |
| Total capacity, ml. benzene adsorbed (K): | | | |
| Weight basis: per gram adsorbent | 0.342 | 0.433 | 0.405 |
| Relative | 1.00 | 1.27 | 1.18 |
| Volume basis: per ml. adsorbent | 0.226 | 0.052 | 0.166 |
| Relative | 1.00 | 0.23 | 0.73 |
| Benzene adsorbed from a 5 benzene-95 normal heptane mixture, ml. (a): | | | |
| Weight basis: per gram of adsorbent | 0.114 | 0.156 | 0.135 |
| Relative | 1.00 | 1.37 | 1.18 |
| Volume basis: per ml. of adsorbent | 0.075 | 0.019 | 0.055 |
| Relative | 1.00 | 0.25 | 0.73 |
| Selectivity for benzene, $a/K$ | 33.3 | 36.0 | 33.3 |
| Relative | 1.00 | 1.08 | 1.00 |

The surface area data show that the two silica gel adsorbents prepared according to Examples I and II above have larger areas than the commercial gel. This may result from the higher calcining temperature used in the preparation of the commercial gel. It is for reasons of this nature that the data for a control gel prepared according to Example II were given. The poured apparent density data show that the adsorbents prepared according to Examples I and II have lower density than the commercial gel. The gel of my invention and prepared according to the method of Example I possesses a considerably lower density than the control gel prepared according to the method of Example II.

The selectivity for benzene of each adsorbent was found by dividing the weight of benzene adsorbed from the 5 per cent benzene mixture per gram of adsorbent by the benzene capacity per gram of that adsorbent and multiplying the quotient by one hundred. For the commercial gel this calculation is 0.114 divided by 0.342 times one hundred equals 33.3. The selectivity for benzene of the control gel was also 33.3 while the selectivity of the adsorbent prepared according to my invention for benzene was 36.0.

The silica gel made according to the process of my invention in addition to being a preferred adsorbent for the adsorption of hydrocarbons from hydrocarbon mixtures is, because of its very low density, a very excellent heat insulation material. The density of minus 200 mesh silica gel made according to the method of my invention has a poured density considerably less than 0.40 gram per milliliter.

Other compounds or mixtures thereof may be used for removing water from the water-wet gel. These compounds should be miscible and nonreactive with water, neutral as regards acidity and alkalinity, and miscible with the hydrocarbon compounds with which the adsorbent is to be activated. Other examples of such water-miscible compounds in addition to acetone are 1-ethoxypropane, 2-ethoxypropane and ethylene oxide.

The above-given data and description relative to the adsorption and selective adsorption of benzene are given merely as an example of the utility of my adsorbent. Upon washing the adsorbent with other hydrocarbons than benzene the selective adsorptive powers of the adsorbent for those other hydrocarbons are likewise improved. The use of benzene in the above examples should not be regarded as limiting the invention, the scope of which is set forth in the following claims.

I claim:
1. A method for increasing the hydrocarbon adsorptive capacity of an adsorbent gel adapted to adsorb hydrocarbons, said adsorbent being prepared by treating an aqueous sodium silicate solution with sulfuric acid to precipitate the gel and washing the precipitated gel with water until free from soluble impurities, comprising the subsequent steps of washing the water-wet gel with acetone to remove the water, washing the acetone-wet gel with a hydrocarbon it is desired to adsorb to remove the acetone and removing the hydrocarbon from the so-treated gel by drying.

2. The method of claim 1 wherein the hydrocarbon desired to be adsorbed is benzene.

3. The method of claim 2 wherein the benzene-wet gel is air dried.

4. A method for selectively adsorbing an aromatic hydrocarbon from admixture with nonaromatic hydrocarbons comprising the steps of adding an aqueous sodium silicate solution to an aqueous sulfuric acid solution to produce a gel type solid mass, washing the solid mass with water until free from soluble impurities, subsequently washing the water-wet mass with acetone to remove the water, washing the acetone-wet mass with said aromatic hydrocarbon to remove the acetone, drying by heating the aromatic hydrocarbon-wet mass to remove the aromatic hydrocarbon and water of hydration, contacting the so-prepared mass with an admixture of said aromatic and nonaromatic hydrocarbons, removing unadsorbed hydrocarbons from the contacted mass and recovering aromatic hydrocarbon in increased yield from said mass.

5. The method of claim 4 wherein the aromatic hydrocarbon is benzene.

6. A method for increasing the hydrocarbon adsorptive capacity of an adsorbent gel adapted to adsorb hydrocarbons, said adsorbent being prepared by treating an aqueous sodium silicate solution with sulfuric acid to precipitate the gel and washing the precipitated gel with water until free from soluble impurities, comprising the subsequent steps of washing the water-wet gel with a compound selected from the group of water-miscible compounds consisting of alcohols, ethers and ketones to remove the water, washing the water-miscible compound-wet gel with a hydrocarbon it is desired to adsorb to remove the water-miscible compound and removing the hydrocarbon from the so-treated gel by drying.

7. A method for preparing solid adsorbent silica gel of increased adsorptive capacity and selectivity for aromatic hydrocarbons comprising treating an aqueous sodium silicate solution with sulfuric acid to precipitate silica gel, washing the precipitated gel with water until free from soluble impurities, subsequently washing the water-wet gel with acetone to remove the water, washing the acetone-wet gel with the aromatic hydrocarbon it is desired to adsorb and removing the hydrocarbon from the so-prepared gel by drying.

8. The method of claim wherein the aromatic hydrocarbon to be adsorbed is benzene.

9. The method of claim 8 wherein the final benzene removal step is an air drying step.

References Cited in the file of this patent
UNITED STATES PATENTS

| | | |
|---|---|---|
| 1,900,859 | Connolly et al. | Mar. 7, 1933 |
| 2,249,767 | Kistler | July 22, 1941 |
| 2,441,572 | Hirschler et al. | May 18, 1948 |
| 2,448,489 | Hirschler et al. | Aug. 31, 1948 |
| 2,449,402 | Lipkin et al. | Sept. 14, 1948 |
| 2,454,941 | Pierce et al. | Nov. 30, 1948 |
| 2,455,445 | See et al. | Dec. 7, 1948 |
| 2,487,804 | Hermanson | Nov. 15, 1949 |